United States Patent [19]

Feng

[11] Patent Number: 4,669,901

[45] Date of Patent: Jun. 2, 1987

[54] KEYBOARD DEVICE FOR INPUTTING ORIENTAL CHARACTERS BY TOUCH

[76] Inventor: I-Ming Feng, 52 Manitou Cir., Westfield, N.J. 07092

[21] Appl. No.: 772,009

[22] Filed: Sep. 3, 1985

[51] Int. Cl.⁴ .............................................. B41J 5/00
[52] U.S. Cl. .................................. 400/484; 400/110; 364/419
[58] Field of Search ................ 400/110, 484; 364/419, 364/900

[56] References Cited

U.S. PATENT DOCUMENTS

| | | | |
|---|---|---|---|
| 2,613,795 | 10/1952 | Yutang | 400/110 |
| 4,327,421 | 4/1982 | Wang | 400/484 |
| 4,379,288 | 4/1983 | Leung et al. | 400/484 |
| 4,462,703 | 7/1984 | Lee | 400/484 |
| 4,544,276 | 10/1985 | Horodeck | 400/484 |

*Primary Examiner*—Edgar S. Burr
*Assistant Examiner*—David A. Wiecking

[57] ABSTRACT

This invention relates to a keyboard device for typing and inputting characters in Chinese and other oriental languages. In particular, the keyboard device of this invention comprises a plurality of keys representing selected strokes, combinations of strokes, radicals and some characters, collectively called the configurations, which are arranged in a particular way and thus makes it possible to type and to input Chinese and oriental characters entirely by touch. By dividing each oriental character into components which resemble the special configurations on the keys, the typing and inputting can be carried out by depressing the keys representing the component configurations without the need of any "menu" selection step. The keyboard device and method of this invention can be used in typewriters, word processors, computers, typesetting machines, teletype machines, telecommunication machines and other machines that use or require a keyboard to input characters in Chinese or other oriental languages.

The keys individually and in combination, generate digital codes which are interfaced by an electronic unit to a Chinese character generator, thereby converting the codes into CRT display or printed output form. Shift, ditto, and image keys are provided which modify the codes selected by the other keys, thereby causing the output of shifted or uppercase characters, selected combination characters, or selected mirror image characters respectively.

7 Claims, 1 Drawing Figure

KEYBOARD DEVICE FOR INPUTTING ORIENTAL CHARACTERS BY TOUCH

This invention relates to a keyboard device and method for typing and inputting characters in Chinese and other oriental languages. In particular, the keyboard device of this invention comprises a plurality of keys representing selected strokes, combinations of strokes, radicals and some characters, collectively called the configurations, which are arranged in a particular way and thus makes it possible to type and to input Chinese and oriental characters entirely by touch. By dividing each oriental character into components which resemble the special configurations on the keys, the typing and inputting can be carried out by depressing the keys representing the component configurations without the need of any "menu" selection step. The keyboard device and method of this invention can be used in typewriters, word processors, computers, typesetting machines, teletype machines, telecommunication machines and other machines that use or require a keyboard to input characters in Chinese or other oriental languages.

One of the formidable obstacles to the office automation, micro-computerization, automatic type-setting for printing and telecommunication modernization in the orient is the non-alphabetic nature of the oriental characters which defy a simple keyboard for effecient typing and data inputing. A primitive keyboard which is still in use in the orient is simply a two dimensional lattice of characters. A 40 by 60 lattice can contain 2400 characters and is very much like a 2400-key keyboard. The typist or operator has to hunt down among the 2400 keys the desired character to be typed very much like looking up a word in a dictionary and then move a special pointer to select it for the machine to print. What is more discouraging is the enormously large number of characters, about 9,000, needed in every day use. This requires four 2400-key keyboards. In recent years, some improvements such as those disclosed in U.S. Pat. Nos. 4,064,983 and 2,534,330 make this kind of typing machine only somewhat less clumsy but still far from an acceptably efficient machine. Beside the primitive typing machine, numerous attempts have been made to classify the enormously large number of characters into groups by introducing complex rules. Among them, the more promising ones are the radical and the phonetic oriented methods, such as those disclosed in U.S. Pat. Nos. 4,228,507, 4,096,934 and others. Because of the large number of characters having the same radical or the same pronunciation, the radical and the phonetic oriented input methods require not only complex rules but also, at the very minimum, one "menu" step in which a number of characters are disposed on the monitor screen and the desired one is selected. This step not only disrupts the rhythm of typing or work-inputting but also sets a severe speed bottleneck. Besides the radical and the phonetic oriented input methods, the stroke oriented methods classify the basic single strokes quite arbitrarily into a small number of groups, such as those disclosed in U.S. Pat. Nos. 4,505,602 and 4,462,703. However, an ideographic character still has to be constructed by stroke with the keys each representing a single stroke. This is clumsier than copying the same character by hand. The fact that in the orient hand-copying is still preferred to the use of typing machine tells everything about the current state of prior art.

The present invention provides a keyboard device with keys representing basic strokes, combinations of strokes, radicals and characters which resemble numerals and are assigned to key positions in numerical sequence according to the numeral they resemble making it not only possible but also easy and quick to locate the desired keys entirely by touch and without constant viewing of the keyboard. This method of typing is commonly known as "touch" typing. The preferred arrangement of the keys in numerical sequence is to have them in a straight linear row. This facilitates the multi-row arrangement in which the row below the home-base row represents simpler versions or variations of the configurations on the home keys and the row above represents more complex versions or variations of the configurations on the home-base keys. Thus any desired key in the two adjacent rows also can be located from the home base positions entirely by touch.

The keyboard device of this invention also contains a mirror image key to take the advantage of many oriental characters containing two configurations which are mirror images or nearly mirror images to each other. The mirror image key further improves the speed of typing or inputting. In addition, the keyboard device of the present invention contains a ditto key to take the advantage of many oriental characters containing two identical or nearly identical configurations. Similar to the mirror image key, the ditto key also further improves the speed. The configuration, mirror image and ditto keys of the present invention can be used in conjunction with the commonly used keys including the alphanumeric, function, control, command, arrow and "menu" keys.

In the preferred embodiment of this invention, the keyboard device is a standard electronic QWERTY keyboard which has been modified with the key tops unique to this invention.

The keyboard is used with a keyboard encoder, as is known in the art, which generates a unique electronic code each time a key is depressed. Keyboards made up of rows of key switches are usually combined with keyboard encoders in one package. The QWERTY keyboard is usually sold with an encoder which outputs an ASCII code corresponding to the standard typewriter configuration used in most computer or word processing terminals.

In order to function in the desired manner, the keyboard must be used with additional components which exist in the art. The first is a Chinese or oriental character generator circuit which is usually in the form of an integrated Read Only Memory circuit, which contains at each memory location, the information necessary to generate a particular Chinese character on a video display system or an electronic printer. These character generators can be pre-programmed with a vocabulary of different characters, each one generated when a specific memory location is selected. The keyboard is interfaced to the Chinese character generator by one of several possible means. A computer can be used which can be programmed to select a particular memory location the configuration generator when a particular key or combination of keys, is pressed. When the shift key is pressed simultaneously with a second key, the code of the second key is modified to select the shifted configuration indicated on that second key. When the ditto key is pressed subsequent to the pressing of another key or combination of keys, the code generated by the key or combination of keys is modified to select a multiple version of the configuration selected by the key or combination of keys by themselves, assuming such a multiple is a valid Chinese character stored in, and reproducible by the Chinese character generator. When the image key is pressed subsequent to the pressing of another key or combination of keys, the code generated by the key or combination of keys is modified to select the mirror images of the configuration selected by the key or combination of keys by themselves, assuming again, such a mirror image configuration is a valid Chinese character stored in, and reproducible by the Chinese character generator. By altering the program in the computer, any key can be used to select any location in the configuration generator. This permits the method of the invention to be used with a QWERTY keyboard or any suitable keyboard encoder combination once the key tops are changed as described hereto and the computer creates the desired interface so that a chosen key press or group of key presses, selects via the interface, the memory location of the desired character.

The invention described herein relates only to the unique key arrangement of the keyboard device and the method of usage of the keyboard so as to facilitate the "touch" typing of Chinese configurations.

An oriental character can be divided into components which resemble the configurations shown on the keys. The typing or imputting of a Chinese or oriental character is carried out by depressing the keys representing the component configurations in the general writing stroke sequence. As mentioned in the preceeding paragraphs, the configurations resemble the numerals and are arranged in numerical sequence according to the numerals they resemble. The desired keys can be located entirely by touch resulting in an output of a set of codes from the encoder. This output is read into the buffer memory of the interface (which can be a programmable computer). By depressing the space bar to signify the completion of code for this character, the Chinese character generator receives the complete set of codes and converts it into a dot matrix or other form of display or print. No "menu" step is involved nor is it needed in this process. Furthermore, since most of the ideographic configurations represented by the keys of the present invention consist of two or more strokes and about one third of them consist of four or more strokes, the method of the present invention is superior to the method of constructing an ideographic character stroke by stroke with keys each representing only a single stroke.

DESCRIPTION OF THE PREFERRED EMBODIMENT

Figure 1:
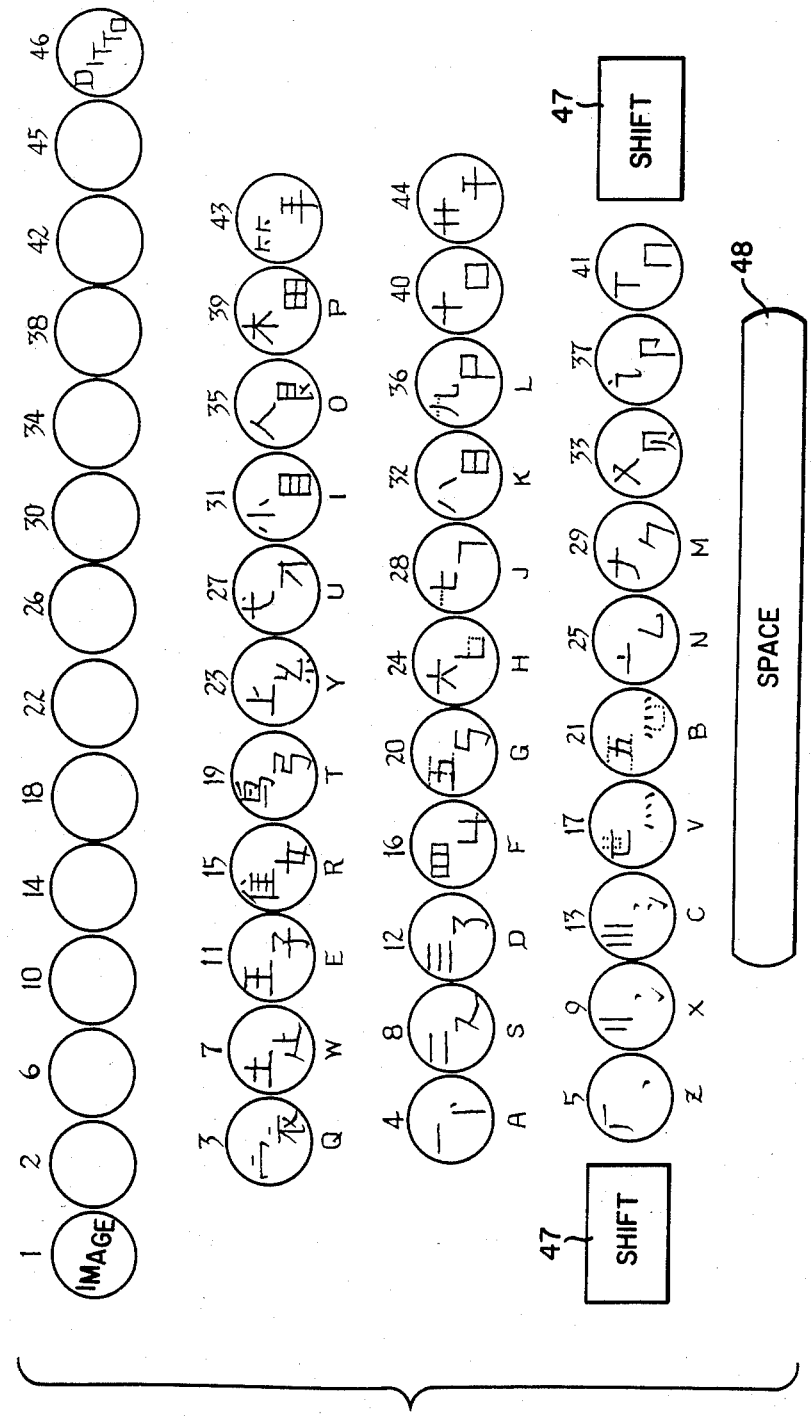
FIG. 1 illustrates the keyboard of the present invention. The identification or reference key numbers are shown above the keys for quick identification. The alphabets they represent in a standard alphanumeric keyboard are shown below the keys so that the keys can be related to these in an alphanumeric key board. The keys in FIG. 1 shown without alphanumeric equivalents can be used to represent optional symbols. Their choices and arrangement depend on the intended use for the invention, i.e., for business or scientific use.

The following example represents the preferred embodiment of the present invention and is not to be construed as a limitation upon the the scope of the invention as set forth in the appended claims.

Referring now to the attached drawing, there is shown the keyboard of the present invention. The oriental configurations the keys represent are as shown. It shows four rows of keys. Similar to an English alphanumeric keyboard, the second row from the bottom row serves as the home-base row for the fingers. There are eleven keys in this row. In the unshifted position equivalent to the lower case letter in English alphabets, they represent the following Chinese configurations: (a) the first configuration key on the left, key 4, representing a vertical stroke resembling the arabic numeral 1 with a dot on the right hand side near the top of the stroke, (b) the second key from the left, key 8, representing a Chinese radical denoting motion and resembling arabic numeral 2, (c) the third key from the left, key 12, representing a Chinese character resembling arabi numerals 3 meaning concluded as an adjective and to understand as a verb, (d) the fourth key from the left, key 16, representing a two-stroke combination resembling arabic numeral 4 consisting of a lower left angle plus a vertical stroke on the right, (e) the fifth key from the left, key 20, representing a two-stroke combination which represents the lower part of the Chinese character which resembles the arabic numeral 5 meaning bow as in bow and arrow, (f) the sixth key from the left, key 24, representing a lower left angle stroke resembling a portion of six, (g) the seventh key from the left, key 28, representing an upper right angle resembling arabic numeral 7, (h) the eighth key from the left, key 32, representing the Chinese character meaning sun resembling arabic numeral 8, (i) the ninth key from the left, key 36, representing a three-stroke combination consisting of a long vertical stroke, one upper right angle and one short horizontal stroke forming a square with an elongated vertical stroke on the left resembling the mirror image of 9, (j) the tenth key from the left, key 40, representing the Chinese character meaning a mouth and resembling arabic numeral 0, (k) the eleventh key from the left, key 44, representing two horizontal strokes plus a vertical stroke forming a three-stroke combination resembling the chinese numeral thousand.

The keys in this row also serve as the home-base positions for the fingers. At their home-base positions, the left fingers will be on keys 4, 8, 12, 16 and the right fingers on the keys 28, 32, 36, 40. Since the Chinese configurations resembling the arabic numerals are in numerical sequence, the desired key can be located easily and quickly by touch.

The keys in the bottom row are located below the home keys. In the unshifted position, each of these keys in the bottom row represent a simpler version or a variation of the configurations on the home keys. For example, the key below key 16, which resembles the arabic numeral four, is key 17, representing a four-dot configuration. The pronunciation of a dot in Chinese sounds the same as the Chinese word meaning below. This makes it easy to remember that the four-dot key 17 is below the home key 16 which has pictured on it the Chinese configuration which resembles the arabic numeral four. The oriental configurations represented by the lower case positions of these keys are as follows: (a) The first configuration key on the left, key 5, represents a single dot, (b) the second key from the left, 9, represents two dots arranged in a vertical column denoting ice, (c) the third key from the left, key 13, represents three dots arranged in a vertical column denoting water, (d) the fourth key from the left, key 17, represents four dots in a horizontal row denoting fire, (e) the fifth key from the left, key 21, represents the Chinese character meaning a heart and resembling five horizontal dots, (f) the sixth key from the left, key 25, represents a combination of an acute angle and a dot forming a triangle with an incomplete side on the right as a variation of the configuration which resembles the arabic numeral six 24, (g) the seventh key from the left, key 29, representing a two-stroke combination resembing the configuration which resembles the arabic numeral seven 28 with a slant stroke added on the left, (h) the eighth key from the left, key 33, representing a Chinese character meaning a shell and resembling the Chinese configuration which resembles the arabic numeral eight 32, (i) the ninth key from the left, key 37, representing a simpler version of the mirror image of the Chinese configuration which resembles the arabic numeral nine 36 with the horizontal stroke reduced to a hook, denoting something official or related to the time, (j) the tenth key from the left, key 41, represents a combination of a vertical stroke and an upper right angle as a simpler version of Chinese configuration which resembles a squarish arabic numeral zero 40 without the horizontal bottom line.

In the Chinese language, a complex version of something is described by a work meaning above or higher. Thus, the keys just above the home keys represent more complex variations of the configurations on the home keys. For example, key 11, is above the key which corresponds to the Chinese configuration which resembles the arabic numeral three 12. Its lower case position representing a character which is simply a configuration resembling the arabic numeral three with an additional stroke. Sometimes, a more complex homonym is used. For example, key 3 is above the key which corresponds to the Chinese configuration which resembles the arabic numeral one 4. Its lower case position represents a character that sounds exactly like the word meaning one in Chinese but is more complex in shape. There are eleven keys in this row. The oriental configurations represented by the lower case positions of these keys are as follows: (a) The first configuration key on the left, key 3, representing the Chinese character meaning an article of clothing which is a homonym of the Chinese numeral one, (b) the second key from the left, key 7, representing, of the Chinese character meaning to walk, the bottom half resembling the Chinese configuration which resembles the arabic numeral two with vertical stroke and a short horizontal stroke added on the top, (c) the third key from the left, key 11, represents the Chinese character meaning a son which resembles the arabic numeral three plus a horizontal stroke, (d) the fourth key from the left, key 15, represents the Chinese character meaning a daughter which resembles the arabic numeral four plus a horizontal stroke, (e) the fifth key from the left, key 19, represents the Chinese character whose bottom half resembles the arabic numeral five and whose meaning is a bow as in the bow and arrow, (f) the sixth key from the left, key 23, representing the Chinese radical denoting the thread and resembling two arabic numeral sixes one piggy backed on the other plus three dots, (g) the seventh key from the left, key 27, represents the Chinese character meaning talent which resembles the arabic numeral seven plus a slant stroke, (h) the eighth key from the left, key 31, represents a Chinese character meaning an eye and resembling the arabic numeral eight with an extra horizontal stroke, (i) the ninth key from the left, key 35, represents a Chinese character meaning hard and resembling the mirror image of the arabic numeral nine with an extra horizontal stroke inside the square and two extra dots near the bottom, (j) the tenth key from the left, key 39 represents the Chinese character meaning a piece of farm land and resembling the arabic numeral zero plus a horizontal stroke and a vertical stroke inside the square, (k) the eleventh key from the left, key 43, represents the Chinese character meaning a hand and resembling the Chinese thousand plus an extra horizontal stroke.

The shift key 47 shifts the keys to represent the uppercase or capital letters. In the keyboard of this invention, depression of the shift key shifts the home-base keys in the second row from the bottom to represent configurations which resemble or are a part of the Chinese numerals. Since the Chinese numerals and hence the configurations that resemble them are more complex then the arabic numerals, they can be considered as the capital numerals. Because these configurations are arranged also in a numerical sequence according to the numerals they resemble they can also be located by touch. There are eleven keys in this row. The oriented configurations represented by the upper case positions of these keys are as follows: (a) The first configuration key on the left, key 4, representing a horizontal stroke resembling the Chinese numeral one, (b) the second key from the left, key 8, representing two horizontal strokes resembling the Chinese numeral two, (c) the third key from the left, key 12, representing three horizontal strokes resembling the Chinese numeral three, (d) the fourth key from the left, key 16, representing a rectangle with two short vertical strokes inside resembling the Chinese numeral four, (e) the fifth key from the left, key 20, representing a combination of an upper right angle and a horizontal stroke which are the last two strokes of the Chinese numeral five, (f) the sixth key from the left, key 24, representing the chinese character meaning big which resembles the Chinese numeral six, (g) the seventh key from the left, key 28, representing a configuration resembling the Chinese numeral seven but with the left half of its horizontal stroke omitted, (h) the eighth key from the left, key 32, representing two dots arranged in a horizontal row resembling the chinese numeral eight, (i) the ninth key from the left, key 36, representing the Chinese numeral nine with the horizontal part of its second stroke omitted, (j) the tenth key from the left, key 40, representing a horizontal stroke plus a vertical stroke resembling the Chinese numeral ten, (k) the eleventh key from the left, key 44, representing a three-stroke configuration consisting of one horizontal stroke and two vertical strokes resembling the Chinese numeral twenty.

The upper case positions of the keys below the Chinese numeral configuration keys in the bottom row represent variations or parts of the Chinese numerals. For example, the upper case key 25, below the Chinese configuration which resembles the arabic numeral six key 24, represents an abreviated version of the Chinese numeral six by taking only its upper half. There are ten keys in this bottom row. The oriental configurations represented by the upper case positions of these keys are as follows: (a) The first configuration key on the left, key 5, representing a horizontal or a vertical sweep, (b) the second key from the left, key 9, representing two vertical line strokes which is a radical denoting a knife, (c) the third key from the left, Key 13. representing three vertical strokes which resembles the Chinese character meaning a mountain stream, (d) the fourth key from the left, key 17, represents a combination of a horizontal stroke and a lower left angle resembling a portion of the Chinese numeral four, (e) the fifth key from the left, key 21, representing a combination of a slant stroke and an angle forming the Chinese character meaning force and resembling the middle part of the Chinese numeral five, (f) the sixth key from the left, key 25, representing a combination of a dot and a horizontal line resembling the upper half of the Chinese numeral six, (g) the seventh key from the left, key 29, representing a horizontal line plus a sweep to the left resembling the mirror image of the Chinese numeral seven, (h) the eighth key from the left, key 33, representing a two-stroke combination formed by extending the two strokes in the Chinese numeral eight to form two intersecting slant lines, (i) the ninth key from the left, key 37, representing a simpler version of the Chinese numeral nine by reducing the left sweep to a dot resembling the radical denoting words and speeches, (j) the tenth key from the left, key 41, representing a two-stroke combination which is the lower half of the Chinese numeral ten.

The upper-case positions of the keys above the Chinese numeral configuration keys represent Chinese configurations which are related to the numerals but are structurally more complex. For example, the configuration represented by the upper-case position of key 11 above the key resembling an arabic numeral 3 key 12, is a configuration having three horizontal strokes with a vertical stroke added in the middle. This row has eleven keys. The oriental configuration represented by the upper-case positions of these keys are as follows: (a) The first configuration key on the left, key 3, representing the Chinese radical generally denoting a shelter and resembling a horizontal stroke with a dot on the top another dot on the left and a hook on the right, (b) the second key from the left, key 7, representing the Chinese character meaning soil and resembling two horizontal strokes plus a vertical stroke, (c) the third key from the left, key 11, representing the Chinese character meaning a king and resembling three horizontal strokes plus a vertical stroke, (d) the fourth key from the left, key 15, representing the Chinese character meaning a feather which has four horizontal strokes, (e) the fifth key from the left, key 19, representing the Chinese character meaning a bird which has five horizontal strokes, (f) the sixth key from the left, key 23, representing the Chinese character meaning above which resembles the upper part of the Chinese numeral six plus a short slant stroke on the right, (g) the seventh key from the left, key 27, representing the Chinese character meaning to shoot with bow and arrow and resembling the Chinese numeral seven plus a dot on the upper right corner, (h) the eighth key from the left, key 31, representing the Chinese character meaning small and resembling the Chinese numeral eight with a vertical stroke added in the middle, (i) the ninth key from the left, key 35, representing the Chinese character meaning a person and resembling the Chinese configuration which resembles the arabic numeral nine with the top part squeezed together, (j) the tenth key from the left, key 39 representing the Chinese character meaning wood or a tree and resembling the Chinese numeral ten plus two slant stokes, (k) the eleventh key from the left, key 43, representing the Chinese radical denoting bamboo and resembling the Chinese numeral twenty plus two dots.

After key or group of keys are depressed to select a character to be generated, the space key 48 is depressed to signal the end of the code for the desired character to the interface.

Many oriental ideographic characters or parts thereof consist of two configurations which are mirror images or nearly mirror images to each other. The present invention includes an image key 1 which represents the mirror image of the combined configuration put together by the keys actuated prior to pressing the mirror image key 1. The image key 1, modifies the digital code produced by the keys pressed immediately before it. The interface in turn selects the memory location in the Chinese character generator containing the generating instructions for forming a mirror image character selected by the image key 1 and the keys pressed immediately before it. If no such Chinese character exists, no character is generated by the system and an error message can be generated by the interface, either audibly or with a warning lamp. In addition, many oriental characters or part thereof consist of two identical or nearly identical configurations. The present invention also includes a ditto key 46 which represents a duplication of the combined configuration put together by the keys actuated prior to actuation of the ditto key 46. These two keys bear no particular spatial relation to the configuration keys and therefore, can be located at any convenient locations. In FIG. 1 the two keys at the left and right ends of the fourth row from the bottom row are used as the image and ditto keys, keys number 1 and 46 respectively. Another choice might be to split the space bar into two halves with the image and the ditto key inserted in the middle.

The typing or inputting of chinese or oriental characters using the keyboard device of the present invention which utilizes a standard QWERTY ASCII keyboard with its key tops modified as per FIG. 1 is illustrated by the following example. The configuration represented by the lower case positions of keys 15 and 11 together form the Chinese character " 好 " meaning good. Upon depressing key 15 and then key 11, the encoder which is part of the standard QWERTY electronic keyboard, produces the ASCII binary digital code of the alphabets r and then e, or in the hex notation H"7265". The completion of the code set is indicated by touching the space bar. Thus, the binary digital code of the alphabets r and e, in the hex notation, H"7265" is the digital transcription of the Chinese character " 好 " meaning good, and can be stored in a memory means for susequent retrieval, transmitted through transmission means or forwarded to the interface device described herein as if it were an alphanumeric word "re". Upon receiving the complete set of codes, the Chinese character generator converts the codes into a dot matrix or other form of CRT screen display or print of the said Chinese character.

A Chinese character of average complexity requires on the average two or three keys to complete the inputting. As an illustration, the Chinese character " 立 " meaning straight can be input by depressing the following three keys in the indicated sequence: upper case of key 40, lower case of key 41, and then upper case of key 12. In the commonly used vocabulary, there is a 21-stroke Chinese character " 矗 " which is formed by stacking together three of the character meaning straight to mean standing vertically up like a sky scraper. In such a case and other similar ones, the ditto key 46 becomes very useful, that is, after the third key 46 the afore-mentioned sequence for inputting the character meaning straight, the ditto key 46 is depressed twice instead of repeating the 3-key sequence twice. The ditto key 46, modifies the digital code produced by the 3-key sequence. The interface in turn selects the memory location in the Chinese character generator containing the generating instructions for forming the "stacked" Chinese character. The ditto key 46 can be used only to select Chinese characters which are valid multiple type configurations stored in the character generator. If the ditto key 46 is pressed following a key sequence, in an attempt to produce a multiple character which is not a valid Chinese character, no character will be generated by the system and an error message can be generated by the interface, either audibly or with a warning lamp. The oriental languages contain many very complex characters. With the keyboard of this invention, a complex character needs on the average five or six keys. Many complex characters can be input with only four keys. For instance, the character " 鸚鵡 " meaning a parrot can be input by depressing the following four keys in the indicated sequence: lower case of key 33, lower case of key 33, lower case of key 15, and then upper case of key 19.

Most oriental languages are related to the Chinese language. For example, the written form of Japanese language contains several thousand Chinese characters although they may or may not have the same meaning as in the Chinese language. Nevertheless, the Japanese numerals are identical to the Chinese numerals. Thus, a configuration that resembles a Chinese numeral also resembles a Japanese numeral. In addition, the written Japanese language also include about 46 Japanese Syllabic symbols for which efficient keyboards already are in use. The present invention are applicable to the Chinese characters in the Japanese language and therefore, can be used in conjunction with the syllabic symbols keyboard to form a complete keyboard for the Japanese language.

What is claimed is:

1. Apparatus for entering Chinese characters into an electronic typewriter, computer, or word processing system, said apparatus comprising a keyboard with a plurality of keys which are each assigned positions within linear rows, said rows arranged around a home-base row to facilitate touch typing, said keys and combinations of said keys selecting basic strokes, combinations of strokes, radicals and characters of the Chinese language, said keys including a shift key, a ditto key, and an image key, said keys in home-base row selecting configurations described as follows:

(a) the first key on the left selects a vertical stroke resembling the arabic numeral 1 with a dot on the right hand side near the top of the stroke, (b) the second key from the left selects the Chinese radical denoting motion, (c) the third key from the left selects the Chinese character meaning concluded as an adjective and to understand as a verb, (d) the fourth key from the left selects a two-stroke combination resembling the arabic numeral 4 consisting of a lower left angle plus a vertical stroke on the right, (e) the fifth key from the left selects a two-stroke combination which is the arabic numeral 5-shaped lower part of the Chinese character meaning bow as in bow and arrow, (f) the sixth key from the left selects a lower left angle stroke resembling a portion of the arabic numeral 6, (g) the seventh key from the left selects an upper right angle resembling the arabic numeral 7, (h) the eighth key from the left selects the Chinese character meaning sun, (i) the ninth key from the left selects a three-stroke combination consisting of a long vertical stroke, one upper right angle and one short horizontal stroke forming a square with an elongated vertical stroke on the left, (j) the tenth key from the left selects the Chinese character meaning mouth, (k) the eleventh key from the left selects a three-stroke configuration consisting of two horizontal and one vertical stroke resembling the Chinese numeral thousand.

2. Apparatus as described in claim 1 wherein, for the shifted positions of keys in the home-base row, the numerals are the Chinese numerals from one to ten plus Chinese numerals selected from twenty, thirty, hundred, thousand and ten thousand.

3. Apparatus as described in claim 1 wherein the shifted positions of the home-base row select configurations described as follows: (a) the first key on the left selects a horizontal stroke, (b) the second key from the left selects two horizontal strokes, (c) the third key from the left selects three horizontal strokes, (d) the fourth key from the left selects a rectangle with two short vertical strokes inside, (e) the fifth key from the left selects a combination of an upper right angle and a horizontal stroke, (f) the sixth key from the left selects the chinese character meaning big, (g) the seventh key from the left selects a configuration resembling the Chinese numeral seven but with the left half of its horizontal stroke omitted, (h) the eighth key from the left selects two dots arranged in a horizontal row, (i) the ninth key from the left selects the Chinese numeral nine with the horizontal part of its second stroke omitted, (j) the tenth key from the left selects a horizontal stroke plus a vertical stroke, (k) the eleventh key from the left selects a horizontal stroke plus two vertical strokes.

4. Apparatus as described in claim 1 wherein:
said keys of a linear row above the home-base row select configurations described as follows: (a) the unshifted position of the first key on the left selects a Chinese character meaning an article of clothing, (b) the unshifted position of the second key from the left selects a Chinese character meaning to walk, (c) the unshifted position of the third key from the left selects a Chinese character meaning a son, (d) the unshifted position of the fourth key from the left selects a Chinese character meaning a daughter, (e) the unshifted position of the fifth key from the left selects a Chinese character meaning the bow as in bow and arrow, (f) the unshifted position of the sixth key from the left selects a Chinese radical denoting the thread, (g) the unshifted position of the seventh key from the left selects a Chinese character meaning talent, (h) the unshifted position of the eighth key from the left selects a Chinese character meaning an eye, (i) the unshifted position of the ninth key from the left selects a Chinese character meaning hard, (j) the unshifted position of the tenth key from the left selects a Chinese character meaning a piece of farm land, (k) the unshifted position of the eleventh key from the left selects a Chinese character meaning the hand, (l) the shifted position of the first key on the left selects a Chinese radical generally denoting a shelter, (m) the shifted position of the second key from the left selects a Chinese meaning soil, (n) the shifted position of the third key from the left selects a Chinese character meaning a king, (o) the shifted position of the fourth key selects a Chinese character meaning a feather, (p) the shifted position of the fifth key from the left selects a Chinese character meaning a bird, (q) the shifted position of the sixth key from the left selects a Chinese character meaning above, (r) the shifted position of the seventh key from the left selects a Chinese character meaning to shoot with bow and arrow, (s) the shifted position of the eighth key from the left selects a Chinese character meaning small, (t) the shifted position of the ninth key from the left selects a Chinese character meaning a person, (u) the shifted position of the tenth key from the left selects a Chinese character meaning wood or a tree, (v) the shifted position of the eleventh key from the left selects a Chinese radical denoting bamboo.

5. Apparatus as described in claim 1 wherein:
said keys of a linear row located below the home-base row select configurations described as follows: (a) the unshifted position of the first key on the left selects a dot, (b) the unshifted position of the second key from the left selects a Chinese character meaning ice, (c) the unshifted position of the third key from the left selects a Chinese character meaning water, (d) the unshifted position of the fourth key from the left selects a Chinese character meaning fire, (e) the unshifted position of the fifth key from the left selects a Chinese character meaning a heart, (f) the unshifted position of the sixth key from the left selects a variation of a Chinese configuration resembling the arabic numeral six, (g) the unshifted position of the seventh key from the left selects a Chinese configuration resembling the arabic numeral seven with a slant stroke added on the left, (h) the unshifted position of the eighth key from the left selects a Chinese character meaning a shell (i) the unshifted position of the ninth key from the left selects a version of a mirror image of a Chinese configuration meaning something official or related to the time, (j) the unshifted position of the tenth key from the left selects a version of the squarish Chinese configuration resembling the arabic numeral zero without the horizontal bottom line, (k) the shifted position of the first key on the left selects a configuration with horizontal and vertical sweeps, (l) the shifted position of the second way from the left selects a radical meaning a knife, (m) the shifted position of the third key from the left selects a Chinese character meaning a mountain stream, (n) the shifted position of the fourth key from the left selects a combination of a horizontal stroke and a lower left angle resembling a portion of the Chinese numeral four, (o) the shifted position of the fifth key from the left selects a Chinese character meaning force, (p) the shifted position of the sixth key from the left selects a combination of a dot and a horizontal line resembling the upper half of the Chinese numeral six, (q) the shifted position of the seventh key from the left selects a horizontal line plus a sweep to the left resembling the mirror image of the Chinese numeral seven, (r) the shifted position of the eighth key from the left selects a two-stroke combination formed by extending the two strokes in the Chinese numeral eight to form two intersecting slant lines, (s) the shifted position of the ninth key from the left selects a version of the Chinese numeral nine resembling the radical denoting words and speeches, (t) the shifted position of the tenth key from the left selects a two-stroke combination which is the lower half of the Chinese numeral ten.

6. Apparatus as described in claim 1 wherein said image key when pressed subsequent to the pressing of a key or keys selecting a first configuration, selects a second configuration which is the mirror image of the first configuration.

7. Apparatus as described in claim 1 wherein said ditto key when pressed subsequent to the pressing of a key or keys selecting a first configuration, selects a second configuration which is comprised of more than one of said first configuration.

* * * * *